United States Patent
Handa et al.

(10) Patent No.: US 7,520,431 B2
(45) Date of Patent: Apr. 21, 2009

(54) COMMUNICATION SYSTEM, READER/WRITER, AUTHENTICATION METHOD, AND COMPUTER PROGRAM

(75) Inventors: Minoru Handa, Kanagawa (JP); Taro Kurita, Tokyo (JP); Norio Uchida, Kanagawa (JP)

(73) Assignee: Felica Networks, Inc., Tokyo (JP)

( * ) Notice: Subject to any disclaimer, the term of this patent is extended or adjusted under 35 U.S.C. 154(b) by 140 days.

(21) Appl. No.: 11/644,126

(22) Filed: Dec. 22, 2006

(65) Prior Publication Data

US 2007/0145124 A1 Jun. 28, 2007

(30) Foreign Application Priority Data

Dec. 27, 2005 (JP) ............................ P2005-374101

(51) Int. Cl.
*G06K 19/06* (2006.01)
*G06K 7/04* (2006.01)
*G06K 7/08* (2006.01)

(52) U.S. Cl. ....................... 235/446; 235/375; 235/380; 235/492; 235/451

(58) Field of Classification Search ................. 235/492, 235/375, 380, 446; 713/169, 191
See application file for complete search history.

(56) References Cited

U.S. PATENT DOCUMENTS

| 4,862,501 | A  | * | 8/1989  | Kamitake et al. | ............ | 713/172 |
| 5,049,728 | A  | * | 9/1991  | Rovin | .......................... | 235/492 |
| 7,303,136 | B2 | * | 12/2007 | Tsunoda et al. | ............. | 235/492 |
| 2004/0232247 | A1 | * | 11/2004 | Tsunoda et al. | ............. | 235/492 |

* cited by examiner

*Primary Examiner*—Thien Minh Le
*Assistant Examiner*—Tuyen K Vo
(74) *Attorney, Agent, or Firm*—Frommer Lawrence & Haug LLP; William S. Frommer; Thomas F. Presson (57) ABSTRACT

A reader/writer that reads or writes information from or in an Integrated Circuit (IC) module, in which one or more applications are loaded, in response to an instruction issued from a controller in which counter-applications compatible with the applications are loaded. The reader/writer includes a memory in which one or more pieces of IC access authentication information that are associated with the applications in the IC module and that are used to authenticate the associated applications respectively are stored. The memory also stores pieces of group authentication information. A control unit authenticates a counter-application using group authentication information and, if the authentication succeeds, permits the counter-application to use IC access authentication information belonging to a group identified with the group authentication information.

9 Claims, 4 Drawing Sheets

COMMUNICATION SYSTEM, READER/WRITER, AUTHENTICATION METHOD, AND COMPUTER PROGRAM

CROSS REFERENCES TO RELATED APPLICATIONS

The present invention contains subject matter related to Japanese Patent Application JP 2005-374101 filed in the Japanese Patent Office on Dec. 27, 2005, the entire contents of which being incorporated herein by reference.

BACKGROUND OF THE INVENTION

1. Field of the Invention

The present invention relates to a communication system, a reader/writer, an authentication method, and a computer program. More particularly, the present invention is concerned with: a reader/writer that reads or writes information from or in an IC module, in which one or more applications are loaded, in response to an instruction issued from a controller in which counter-applications compatible with the applications are loaded; a communication system including the reader/writer; an authentication method to be implemented by the reader/writer; and a computer program.

2. Description of the Related Art

In recent years, a plurality of applications including, for example, an application designed for electronic settlement and an application that accumulates service points provided by a shop have been able to be loaded in an IC module such as an IC chip incorporated in an IC card or a portable cellular phone (refer to, for example, Japanese Unexamined Patent Publication No. 2002-7971). Reading or writing information from or in the IC module is achieved by a reader/writer that is controlled by a counter-application compatible with an application loaded in the IC module. In general, for reading or writing, the reader/writer and IC module mutually authenticate. For reading or writing of information from or in the IC module in which a plurality of applications is loaded, each of the applications in the IC module and the reader/writer should mutually authenticate. For the sake of security, different reader/writers have been included in association with counter-applications in the past.

However, the necessity of a plurality of reader/writers poses various problems concerning an installation space, usability, maintenance, or the like in a shop or the like in which the reader/writers are loaded. More particularly, for example, there is no space for installation of a plurality of reader/writers, a user has to select an appropriate reader/writer that is optimal for desired processing from among the plurality of loaded reader/writers, and maintenance work and costs are needed proportionally to the number of applications.

All pieces of key information for mutual authentication between a reader/writer and each of applications loaded in an IC module are stored in the reader/writer. The reader/writer and the plurality of applications loaded in the IC module mutually authenticate, and the reader/writer reads or writes information.

SUMMARY OF THE INVENTION

However, the aforesaid storage of all pieces of key information in one reader/writer poses a security-related problem. Specifically, a counter-application that controls the reader/writer can acquire and use key information to be needed for mutual authentication between the reader/writer and an application other than an application that is loaded in an IC module and that is compatible with the counter-application.

In order to addresses the foregoing problem, it is desirable to provide a communication system, a reader/writer, an authentication method, and a computer program which enable one reader/writer to read or write information from or in an IC module, in which a plurality of applications is loaded, with security guaranteed.

In order to address the above problem, according to an embodiment of the present invention, there is provided a communication system including an IC module in which one or more applications are loaded, a controller in which counter-applications compatible with the applications are loaded, and a reader/writer that reads or writes information from or in the IC module in response to an instruction issued from the controller. In the communication system, the reader/writer includes a memory in which one or more pieces of IC access authentication information that are associated with the applications loaded in the IC module and that are used for mutual authentications between the reader/writer and the respective applications are stored and in which pieces of group authentication information are stored in association with groups into which the pieces of IC access authentication information are sorted according to the applications. When the reader/writer is requested requests to write or read information in or from the IC module by a counter-application loaded in the controller, the reader/writer and the counter-application mutually authenticate using group authentication information. If the mutual authentication succeeds, the reader/writer and an application loaded in the IC module mutually authenticate using IC access authentication information belonging to a group identified with the group authentication information used for the successful mutual authentication. If the mutual authentication succeeds, the reader/writer reads or writes information from or in the IC module in response to an instruction issued from the counter-application.

According to the embodiment, one or more applications are loaded in an IC module, and a reader/writer holds pieces of IC access authentication information that are used for mutual authentications between the reader/writer and the respective applications. In the reader/writer, the pieces of IC access authentication information are sorted into groups according to the applications, and pieces of group authentication information are held in association with the groups. When the reader/writer is requested to access the IC module by a counter-application in a controller, the reader/writer and the counter-application mutually authenticate using group authentication information. Only when the mutual authentication succeeds, the reader/writer and an application in the IC module mutually authenticate using IC access authentication information associated with the group authentication information. If the mutual authentication succeeds, the reader/writer reads or writes information from or in the IC module.

According to the foregoing configuration, unless mutual authentication between the reader/writer and an application in the IC module succeeds, the controller cannot access the IC module via the reader/writer. IC access authentication information for the mutual authentication is protected by group authentication information. The group authentication information is varied depending on each of pieces of IC access authentication information sorted into groups according to the applications loaded in the IC module. Therefore, even if mutual authentication between any of the counter-applications in the controller and the reader/writer which is performed using one piece of group authentication information succeeds, the counter-application cannot use IC access authentication information protected by any other group authentication information. Consequently, even for reading or writing of information from or in the IC module in which one or more applications are loaded, as long as the reader/writer and the controller mutually authenticate using group authentication information, the reader/writer can achieve the reading or writing of information from or in the IC module, in which a plurality of applications is loaded, with security guaranteed.

In order to address the aforesaid problem, according to another embodiment of the present invention, there is provided a reader/writer that reads or writes information from or in an IC module, in which one or more applications are loaded, in response to an instruction issued from a controller in which counter-applications compatible with the applications are loaded. The reader/writer includes: a memory in which one or more pieces of IC access authentication information that are associated with the applications loaded in the IC module and that are used to authenticate the associated applications respectively are stored and in which pieces of group authentication information are stored in association with groups into which the pieces of IC access authentication information are sorted according to the applications; and a control unit that uses group authentication information to authenticate a counter-application loaded in the controller, and that if the authentication succeeds, permits the counter-application, of which authentication has succeeded, to use IC access authentication information belonging to a group identified with the group authentication information used for the successful authentication.

According to the embodiment, one or more applications are loaded in an IC module, and a reader/writer holds pieces of IC access authentication information that are used to authenticate the associated applications respectively. In the reader/writer, the pieces of IC access authentication information are sorted into groups according to the applications, and pieces of group authentication information are held in association with the groups. When the reader/writer is requested to access an IC module by a counter-application in a controller, the reader/writer uses group authentication information to authenticate the counter-application. Only when the authentication succeeds, the reader/writer permits the counter-application to use IC access authentication information associated with the group authentication information.

According to the foregoing configuration, unless the reader/writer succeeds in authentication of an application loaded in the IC module, the controller cannot access the IC module via the reader/writer. IC access authentication information for the authentication is protected by group authentication information. The group authentication information is varied depending on each of pieces of IC access authentication information that are sorted into groups according to the applications loaded in the IC module. Therefore, when a counter-application loaded in the controller is authenticated based on one group authentication information, the counter-application is permitted to use IC access authentication information associated with the group authentication information but cannot use IC access authentication information protected by any other group authentication information. Consequently, even for reading or writing of information from or in the IC module in which one or more applications are loaded, as long as the reader/writer authenticates the controller using group authentication information, the reader/writer can achieve the reading or writing of information from or in the IC module, in which a plurality of applications is loaded, with security guaranteed.

The pieces of IC access authentication information may be stored in different segments in association with the groups. The segments are memory spaces into which a physical memory is physically divided.

If the control unit succeeds in authentication of a counter-application loaded in the controller, the control unit may use IC access authentication information, which belongs to a group identified with the group authentication information used for the successful authentication, to authenticate an application loaded in the IC module. If the authentication succeeds, the control unit may execute reading or writing of information from or in the IC module in response to an instruction issued from the counter-application.

The control unit may execute mutual authentication between the reader/writer and a counter-application according to a common key encryption method. In this case, the pieces of group authentication information may be common keys. According to the configuration, security can be intensified through the mutual authentication.

The control unit may execute mutual authentication between the reader/writer and an application, which is loaded in the IC module, according to a common key encryption method. In this case, the pieces of IC authentication information may be common keys. According to the configuration, security can be intensified through the mutual authentication.

In order to address the aforesaid problem, according to another embodiment of the present invention, there is provided a computer program allowing a computer to function as the reader/writer. The computer program is stored in a storage device included in a computer, read and run by a CPU included therein, whereby the computer program allows the computer to function as the reader/writer. Moreover, a recording medium in which the computer program is recorded and which is readable by the computer is provided. The recording medium is, for example, a magnetic disk or an optical disk.

In order to address the aforesaid problem, according to another embodiment of the present invention, there is provided an authentication method to be implemented in a reader/writer that reads or writes information from or in an IC module, in which one or more applications are loaded, in response to an instruction issued from a controller in which counter-applications compatible with the applications are loaded. In the authentication method, the reader/writer includes a memory in which one or more pieces of IC access authentication information that are associated with the applications loaded in the IC module and that are used to authenticate the associated applications respectively, and in which pieces of group authentication information are stored in association with groups into which the pieces of IC access authentication information are sorted according to the applications. The authentication method includes: a step of receiving a request for writing or reading of information in or from the IC module from a counter-application loaded in the controller; a step of authenticating the counter-application using group authentication information; and a step of, if the authentication succeeds, permitting the counter-application, of which authentication has succeeded, to use IC access authentication information belonging to a group identified with the group authentication information used for the successful authentication.

The permitting step may include a step at which: an application in the IC module is authenticated using IC access authentication information belonging to a group identified with group authentication information used for the successful authentication; and if the authentication succeeds, information is read or written from or in the IC module in response to an instruction issued from the counter-application.

As mentioned above, according to the embodiments of the present invention, there are provided a communication system, a reader/writer, an authentication method, and a computer program which enable one reader/writer to read or write information from or in an IC module, in which a plurality of applications is loaded, with security guaranteed.

BRIEF DESCRIPTION OF THE DRAWINGS

Embodiments of the present invention will be described in detail based on the following figures, wherein.

DESCRIPTION OF THE PREFERRED EMBODIMENTS

Referring to the appended drawings, a preferred embodiment of the present invention will be described below. Incidentally, in the present specification and drawings, the same reference numerals will be assigned to components having substantially identical functions, and an iterative description will be omitted.

A communication system in accordance with the present invention will be described while being adapted to a communication system 100 including an IC module 106 in which a plurality of applications is loaded, a controller 102 in which counter-applications compatible with the respective applications in the IC module 106 are loaded, and a reader/writer 104 that is controlled by the controller 102 and that reads or writes information from or in the IC module 106.

<Overall Configuration of the Communication System>

Figure 1:
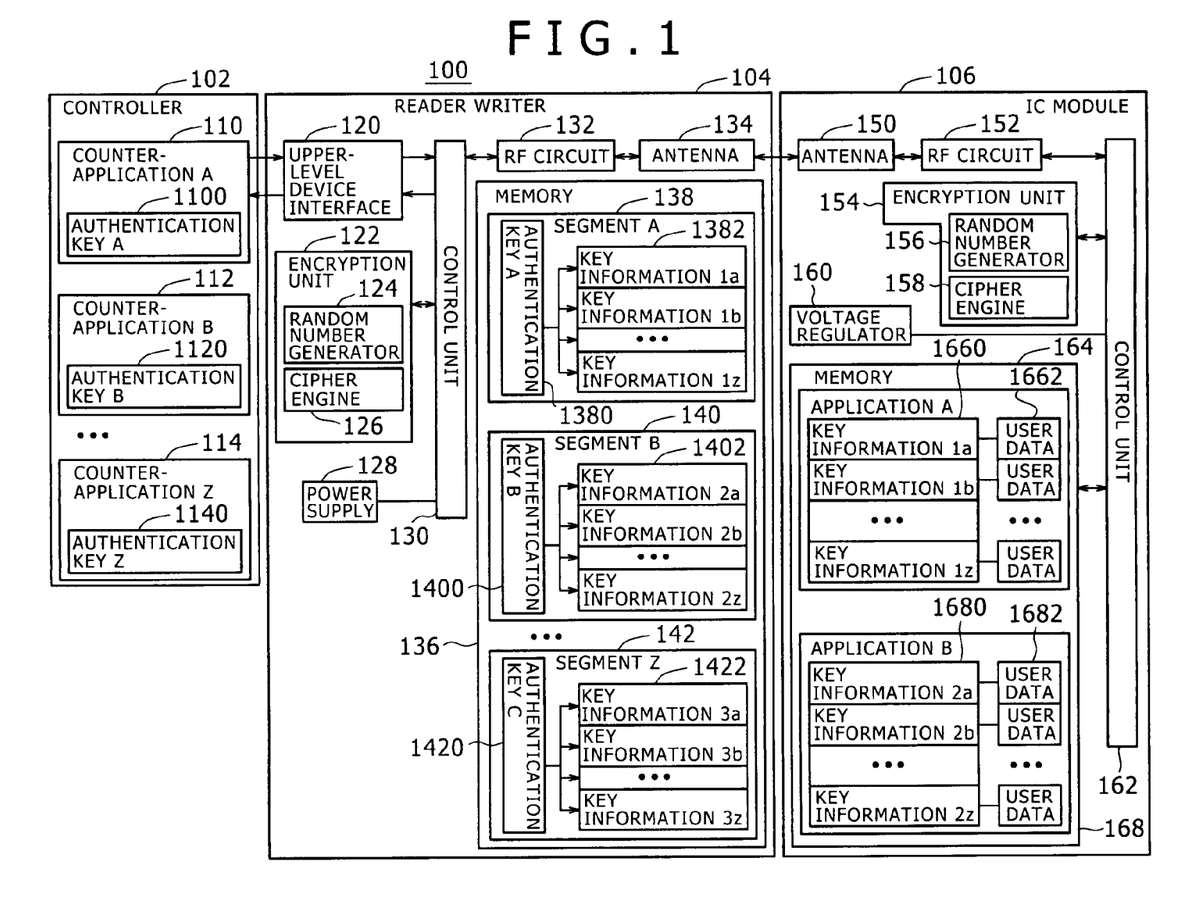
FIG. 1 is a block diagram showing the functional configuration of a reader/writer in accordance with an embodiment of the present invention.

To begin with, the overall configuration of the communication system 100 will be described in conjunction with FIG. 1. The communication system 100 includes the controller 102, reader/writer 104, and IC module 106.

The controller 102 is a computer that controls the reader/writer. One or more counter-applications that are compatible with the applications loaded in the IC module 106 are loaded in the controller 102. Each of the counter-applications writes or reads information in or from the IC module via a compatible application loaded in the IC module. Each of the applications requests the reader/writer 104 to read or write information from or in the IC module, and instructs the reader/writer 104 to read or write the information from or in the IC module. Incidentally, a common library dedicated to processing to be executed in common by the applications, such as, transmission of a request to the reader/writer 104 or mutual authentication to be described later may be included in the controller 102, so that the common library can be used by the applications.

The reader/writer 104 writes or reads information in or from the IC module 106 in response to a request issued from the controller 102. Specifically, the reader/writer 104 receives a request for reading or writing of information from or in the IC module 106 from a counter-application loaded in the controller 102, and reads or writes the information from or in the IC module via an application that is compatible with the counter-application from which the request is received and that is loaded in the IC module 106.

The IC module 106 is an IC chip or the like loaded in mobile equipment, for example, an IC card or a portable cellular phone, and the reader/writer 104 reads or writes information from or in the IC module 106. In the present embodiment, the IC module 106 communicates with the reader/writer 104 by radio and has information read or written therefrom or therein. The radiocommunication is recognized as non-contact communication based on, for example, the near field communication (NFC) standards. The NFC is applied to a relatively narrow range of about 10 cm and is therefore superior in security because a communication party is identified by hand. One or more applications are loaded in the IC module 106. Each of the applications receives a Read or Write request from a counter-application, which is loaded in the controller 102, via the reader/writer 104, and reads or updates information.

The controller 102 and reader/writer 104, and the reader/writer 104 and IC module 106 mutually authenticate. As for the mutual authentication between the controller 102 and reader/writer 104, when the reader/writer 104 reads or writes information from or in the IC module 106, the reader/writer 104 and a counter-application that has requested reading or writing of information mutually authenticate. As for the mutual authentication between the reader/writer 104 and IC module 106, the reader/writer 104 and an application that is loaded in the IC chip and that actually reads or writes information inside the IC chip mutually authenticate.

The reader/writer 104 holds a plurality of pieces of IC access authentication information to be used for mutual authentications between the respective applications loaded in the IC module 106 and the reader/writer. In the present embodiment, the reader/writer 104 and each of the applications, which are loaded in the IC module 106, mutually authenticate according to a common key encryption method. The pieces of IC access authentication information shall be pieces of key information serving as common keys.

Moreover, the reader/writer 104 and a counter-application loaded in the controller 102 mutually authenticate. Only when the mutual authentication succeeds, the reader/writer 104 reads or writes information from or in the IC chip in response to a request issued from the counter-application. Thus, spoofing or fraudulent access to an IC chip is prevented in order to guarantee security. However, if a counter-application having succeeded in mutual authentication between itself and the reader/writer were permitted to access an application other than an application that is compatible with the counter-application and that is loaded in the IC module 106, security could not be guaranteed. Therefore, in the reader/writer 104, pieces of key information to be used for mutual authentications between the reader/writer and the respective applications loaded in the IC module are sorted into groups according to the associated applications, and managed group by group. Thus, the aforesaid problem is avoided. A description will be made later.

The overall configuration of the communication system 100 has been described so far. Next, the functional configurations of the controller 102, reader/writer 104, and IC module 106 respectively will be described in conjunction with FIG. 1.

<Functional Configuration of the Controller>

To begin with, the functional configuration of the controller 102 will be described below. The controller 102 includes a plurality of counter-applications such as a counter-application A 110, a counter-application B 112, etc., and a counter-application Z 114. The respective counter-applications are compatible with an application A, an application B, etc., and an application Z respectively which are stored in the IC module 106. The respective counter-applications read or write information from or in the IC module 106 via the compatible applications.

To be more specific, assuming that the application A in the IC module 106 is, for example, an application designed for electronic settlement, the counter-application A reads the balance of electronic money stored in the IC module 106 via the application A, subtracts a price from the read balance, and writes the difference in the IC module 106 via the application A. Moreover, assuming that the application B in the IC module 106 is an application for accumulating service points provided by a shop, the counter-application B reads the current number of service points stored in the IC module 106 via the application B, adds the number of newly gained service points to the read number of service points, and writes the sum in the IC module 106 via the application B.

The counter-applications include mutually different authentication keys. In the example shown in FIG. 1, the counter-application A includes an authentication key A 1100, the counter-application B includes an authentication key B 1120, and the counter-application C includes an authentication key C 1140. The authentication key A 1100, authentication key B 1120, and authentication key Z 1140 are different from one another. The authentication keys are pieces of authentication information which the respective applications hold for the mutual authentications between the respective applications and the reader/writer 104. In the present embodiment, the mutual authentications between the respective counter-applications in the controller 102 and the reader/writer 104 are achieved according to a common key encryption method. Therefore, the authentication keys are recognized as common keys which the respective applications share with the reader/writer 104. As mentioned later, the reader/writer 104 includes authentication keys corresponding to the authentication key A, authentication B, etc., and authentication key Z respectively. Each of the applications uses its own authentication key to achieve the mutual authentication between itself and the reader/writer 104.

<Functional Configuration of the Reader/Writer>

Next, the functional configuration of the reader/writer 104 will be described below. As shown in FIG. 1, the reader/writer 104 includes mainly an upper-level device interface 120, an encryption unit 122, a power supply 128, a control unit 130, a radiofrequency (RF) circuit 132, an antenna 134, and a memory 136.

The upper-level device interface 120 transmits or receives information to or from the controller 102. For example, the upper-level device interface 120 receives a request for reading or writing of information from or in the IC module from the controller 102. The upper-level device interface 120 transmits or receives data for mutual authentication between the reader/writer and the controller 102.

The encryption unit 122 produces or decrypts ciphertext. The encryption unit 122 includes a random number generator 124 and a cipher engine 126. The encryption unit 122 allows the cipher engine 26 to encrypt a random number, which is generated by the random number generator 124, using an authentication key or key information stored in the memory 136, and thus produces ciphertext. Moreover, the encryption unit 122 allows the cipher engine 126 to decrypt the ciphertext using the authentication key or key information, and thus decrypts the ciphertext.

The power supply 128 supplies power to the reader/writer 104.

The memory 136 is a nonvolatile storage device. An authentication key for mutual authentication between the reader/writer and the controller 102, and key information for mutual authentication between the reader/writer and the IC module 106 are stored in the memory 136. The memory 136 includes a plurality of segments that are memory spaces into which a memory is physically divided. The segments are managed by the control unit 130. The control unit 130 can change the number of segments constituting the memory 136 or the number of pieces of key information that can be stored in the respective segments. The pieces of key information stored in the memory 136 are sorted into groups according to the applications that are loaded in the IC module 106. Incidentally, the reader/writer and the applications at mutually authenticated using the respective pieces of key information. The groups of pieces of key information are stored in the different segments. Furthermore, authentication keys that are examples of pieces of group authentication information are stored in association with the groups in the memory 136. A concrete description will be made below in conjunction with the example shown in FIG. 1.

The memory 136 includes a plurality of segments such as a segment A 138, a segment B 140, etc., and a segment Z 142. Pieces of key information and an authentication key are contained in each segment. A group A 1382 of pieces of key information, that is, key information 1a, key information 1b, etc., and key information 1z is stored in the segment A 138. The group A is associated with the application A stored in the memory 164 included in the IC module 106. The pieces of key information 1a, 1b, etc., and 1z stored in the segment A 138 are common keys to be used for mutual authentication between the reader/writer and the application A loaded in the IC module 106.

An authentication key A 1380 is also stored in the segment A 138. The control unit 130 uses the authentication key A 1380 to decide whether the controller 102 should be permitted to use the pieces of key information in the segment A. The authentication key A 1380 is considered as a common key corresponding to the authentication key A 1100 held in the counter-application A 110 loaded in the controller 102. The control unit 130 uses the authentication key A 1380 for mutual authentication between the counter-application A 110 and the reader/writer. If the mutual authentication succeeds, the control unit 130 permits the counter-application A 110 to use the pieces of key information stored in the segment A.

When the counter-application A 110 is permitted to use the pieces of key information in the segment A138, the counter-application A 110 allows the reader/writer 104 and the application A in the IC module 106 to mutually authenticate using the group A 1382 of pieces of key information, and thus accesses the application A via the reader/writer 104.

On the other hand, the counter-application A 110 that includes neither an authentication key B nor an authentication key Z is not permitted to use the pieces of key information stored in the segment B 140 or segment Z 142. Consequently, the counter-application A 110 cannot access the application B in the IC module 106 via the reader/writer 104. Likewise, the counter-application B 112 in the controller 102 includes the authentication key B 1120, and is therefore permitted to use a group 1402 of pieces of key information stored in the segment B 140 through mutual authentication based on the authentication key B 1400 stored in the segment B 140. Consequently, the counter-application B 112 can access the application B 168 in the IC module 106 via the reader/writer 104. However, since the counter-application B 112 includes neither the authentication key A nor the authentication key Z, the counter-application B 112 cannot access the application A in the IC module 106.

As mentioned above, pieces of key information to be used for mutual authentications between the reader/writer and the respective applications in the IC module 106 are sorted into groups and stored in segments. Different authentication keys are stored in association with the respective groups of pieces of key information (in the respective segments). Consequently, access can be controlled so that only a counter-application including a corresponding authentication key can access an application in the IC module 106.

The control unit 130 controls the entire reader/writer 104. In particular, the control unit 130 uses an authentication key, which is stored in the memory 136, to perform mutual authentication between the reader/writer and the controller 102. Moreover, the control unit 130 uses key information, which is stored in the memory 136, to perform mutual authentication between the reader/writer and the IC module 106. Specifically, when the control unit 130 receives a request for reading or writing of information from or in the IC module 106 from the controller 102 via the upper-level device interface 120, the control unit 130 performs the mutual authentication between the reader/writer and a counter-application in the controller 102 that is the request source. If the mutual authentication succeeds, the control unit 130 permits the counter-application, of which authentication has succeeded, to use the pieces of key information stored in a segment identified with the authentication key used for the mutual authentication. The control unit 130 receives a request issued from the counter-application that is permitted to use the pieces of key information, and in turn uses the pieces of key information to perform mutual authentication between the counter-application and an application in the IC module 106. The control unit 130 then reads or writes information from or in the IC module 106 via the application.

Mutual authentications between the reader/writer and the controller 102 and between the reader/writer and the IC module 106 are, as mentioned above, performed by the control unit 130 according to a common key encryption method. Specifically, for the mutual authentication between the reader/writer and controller 102, the control unit 130 instructs the random number generator 124 to generate a random number, instructs the cipher engine 126 to encrypt the random number using any authentication key stored in the memory 136, and transmits the encrypted random number to the controller 102 via the upper-level device interface 120. The controller 102 decrypts the received random number using a corresponding authentication key, encrypts the decrypted random number using the authentication key, and returns the resultant random number to the reader/writer 104. The control unit 130 in the reader/writer 104 instructs the cipher engine 126 to decrypt the returned random number using the authentication key used for encryption. If the random number generated by the random number generator 124 agrees with the decrypted random number, the control unit 130 recognizes the authentication as a success.

When the controller 102 authenticates the reader/writer 104, the control unit receives a random number, which is generated by the controller 102 and encrypted using an authentication key held in any counter-application, via the upper-level device interface 120. The control unit 130 instructs the cipher engine 126 to decrypt the received random number using an authentication key that is stored in a segment and that corresponds to an authentication key assigned to the counter-application. The control unit 130 instructs the cipher engine 126 to encrypt the decrypted random number using the same authentication key as the authentication key used for the decryption, and returns the resultant random number to the controller 102 via the upper-level device interface 120. The controller 102 decrypts or collates the random number, whereby the reader/writer 104 is authenticated.

Moreover, for mutual authentication between the reader/writer and the IC module 106, the control unit 130 instructs the random number generator 124 to generate a random number, instructs the cipher engine 126 to encrypt the random number using any key information stored in the memory 136, and transmits the encrypted random number to the IC module 106 via the RF circuit 132 and antenna 134. The IC module 106 decrypts the received random number using corresponding key information, encrypts the decrypted random number using the same key information, and then returns the resultant random number to the reader/writer 104. The control unit 130 in the reader/writer 104 instructs the cipher engine 126 to decrypt the returned random number using the key information that is used for the encryption. If the decrypted random number agrees with the random number generated by the random number generator 124, the control unit 130 recognizes the encryption as a success. When the reader/writer 104 is authenticated by the IC module 106, the control unit 130 acts substantially similarly to when the reader/writer 104 is authenticated by the controller 102. Only a difference is that a key to be used to decrypt or encrypt a random number received from the IC module 106 is not an authentication key but key information.

Owing to the foregoing configuration, when the reader/writer 104 receives a request for reading or writing of information from or in the IC module 106 from a counter-application loaded in the controller 102, the reader/writer 104 uses an authentication key, which is assigned to each application loaded in the IC module 106, to perform mutual authentication between itself and the counter-application. If the mutual authentication succeeds, the reader/writer 104 permits the counter-application in the controller 102, of which authentication has succeeded, to access the application in the IC module 106 to which the authentication key used for the mutual authentication is assigned. The reader/writer 104 then reads or writes information from or in the IC module 106 in response to a request issued from the counter-application. Owing to the configuration, the reader/writer 104 prevents a counter-application in the controller 102 from accessing an application other than an application compatible with the counter-application in the IC module 106. Thus, security is guaranteed.

<Functional Configuration of the IC Module>

Next, the functional configuration of the IC module 106 will be described below. As shown in FIG. 1, the IC module 106 includes mainly an antenna 150, an RF circuit 152, an encryption unit 154, a voltage regulator 160, a control unit 162, and a memory 164.

The encryption unit 154 includes a random number generator 156 and a cipher engine 158. The random number generator 156 and cipher engine 158 have the same functions as the random generator 124 and cipher engine 126 respectively included in the reader/writer 104. An iterative description will be omitted.

The voltage regulator 160 regulates a voltage to be applied to the control unit 162.

The memory 164 is a nonvolatile storage device. Pieces of key information for mutual authentication between the IC module and the reader/writer 104, and user data items associated with the respective pieces of key information are stored in the memory 164. A concrete description will be made below in conjunction with the example shown in FIG. 1.

One or more applications are stored in the memory 164. User data items to be used by the respective applications and pieces of key information associated with the user data items are stored in the memory 164. In the example shown in FIG. 1, two applications, that is, an application A 166 and an application B 168 are stored in the memory 164. The applications are read and run by the control unit 162. Assuming that the application A is, for example, an application designed for electronic settlement, the application A holds user data items 1662 each of which represents, for example, a balance or a usable upper-limit amount of money. The application A reads or updates any user data 1662 in response to a request issued from a counter-application A loaded in the controller 102 via the reader/writer 104. Pieces of inherent key information 1a, 1b, etc., and 1z are associated with the respective user data items, and used for mutual authentication between the IC module and the reader/writer 104 that is executed by the control unit 162 at the time of reading or updating the respective user data items.

The control unit 162 controls the entire IC module 106. In particular, the control unit 162 executes mutual authentication between the IC module and the reader/writer 104. Moreover, the control unit 162 reads or updates any user data stored in the memory 164 in response to an instruction issued from the reader/writer 104 of which authentication has succeeded and which has succeeded in authentication.

The functional configurations of the controller 102, reader/writer 104, and IC module 106 respectively included in the communication system 100 in accordance with the present embodiment have been described so far. Next, an authentication method implemented in the communication system 100 in accordance with the present embodiment will be described in conjunction with FIG. 2 to FIG. 4.

<Flow of Authentication in the Communication System 100>

Figure 2:
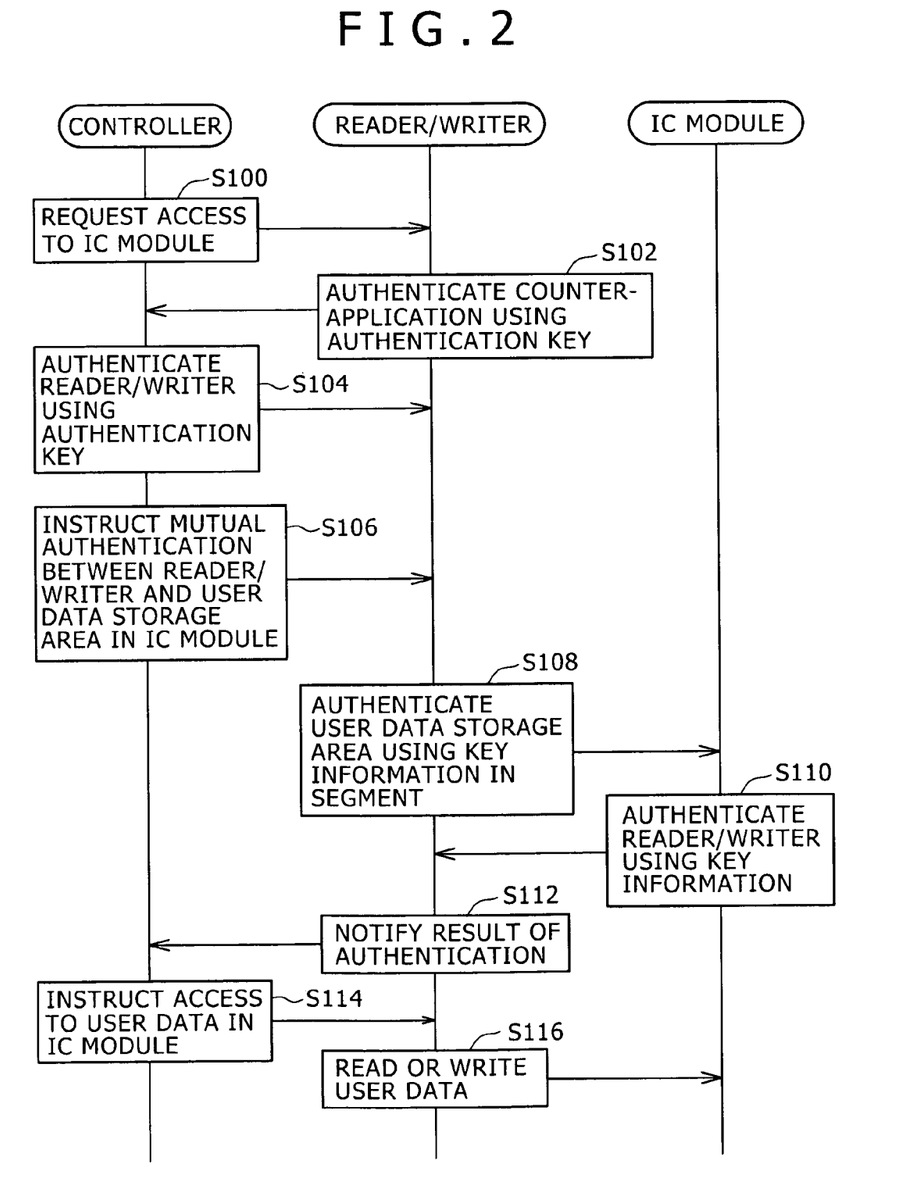
FIG. 2 is a flowchart describing an authentication method to be implemented in a communication system according to the embodiment.

Referring to FIG. 2, a flow or process of authentication to be performed in the communication system 100 will be described below. To begin with, the IC module 106 or controller 102 selects an application or a counter-application that is an entity to be authenticated (not shown). Specifically, assuming that the IC module 106 is, for example, an IC chip incorporated in a portable cellular phone including an input unit, a user manipulates the input unit so as to select and start an application. Otherwise, a user operates the controller 102 so as to select a specific one from among the plurality of counter-applications and start the counter-application.

Assuming that the IC module 106 is put over the reader/writer 104 with a specific application (counter-application) selected at the IC module 106 or controller 102, the IC module 106 is approached to a communicative range within which the IC module 106 can communicate with the reader/writer 104. In this state, the controller 102 requests the reader/writer 104 to access the IC module 106 (S100).

The reader/writer 104 uses an authentication key inherent to the selected counter-application to authenticate the counter-application (S102). The controller 102 uses the authentication key inherent to the selected counter-application to authenticate the reader/writer 104 (S104). If both the reader/writer 104 and controller 102 succeed in authentication, the controller 102 instructs the reader/writer 104 to execute mutual authentication between the reader/writer and specific user data in the IC module 106 (S106).

The reader/writer 104 uses key information stored in a segment, which is identified with the authentication key used at step S102, to authenticate the instructed user data (S108).

The IC module 106 uses the key information to authenticate the reader/writer 104 (S110). The reader/writer 104 notifies the controller 102 of the result of the authentication (S112).

If both the reader/writer 104 and IC module 106 succeed in authentication, the controller 102 instructs the reader/writer 104 to access (read or write) the user data whose authentication has succeeded (S114). The reader/writer 104 reads or writes the user data stored in the IC module 106 in response to the instruction (S116).

<Authentication by the Reader/Writer>

Figure 3:
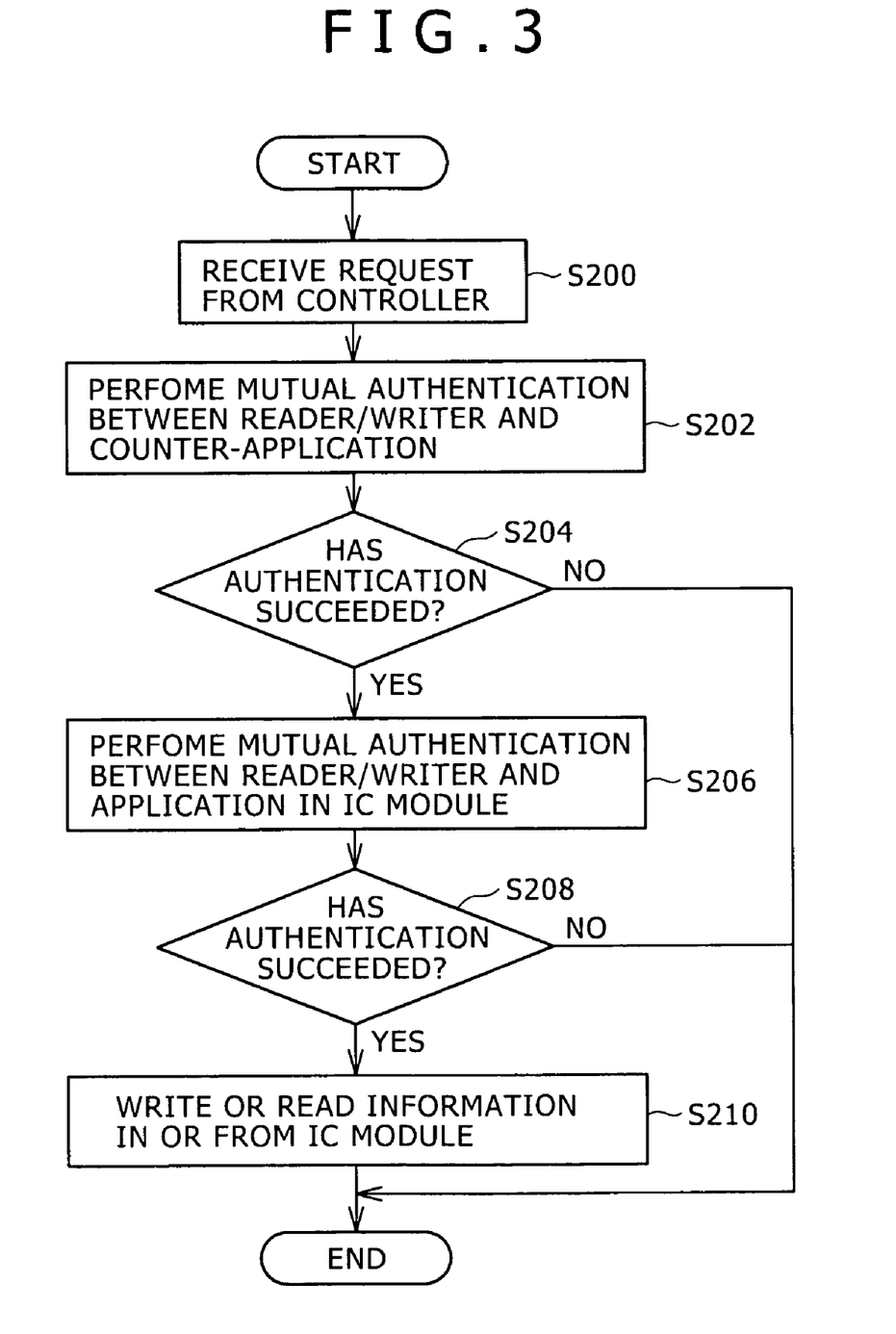
FIG. 3 is a flowchart describing an authentication method to be implemented in a reader/writer according to the embodiment.

Next, a flow or process of authentication to be executed by the reader/writer 104 will be described in conjunction with FIG. 3. To begin with, the reader/writer 104 receives a request for access to the IC module 106 from any counter-application loaded in the controller 102 (S200). In response to the request, the reader/writer 104 performs mutual authentication between itself and the counter-application that is a request source (S202). The reader/writer 104 decides whether the mutual authentication has succeeded (S204). If the mutual authentication has failed, the process is terminated. On the other hand, if the mutual authentication has succeeded, the reader/writer 104 and an application in the IC module 106 compatible with the counter-application mutually authenticate (S206). More specifically, the reader/writer 104 authenticates user data to be used by the application, and the IC module 106 authenticates the reader/writer so as to decide whether the reader/writer is granted an access right for access to the user data (whether the reader/writer has corresponding key information). The reader/writer 104 decides whether the mutual authentication has succeeded (S208). If the mutual authentication has failed, the process is terminated. On the other hand, if the mutual authentication has succeeded, the reader/writer 104 reads or writes information from or in the IC module 106 in response to the request issued from the counter-application loaded in the controller 102 (S210).

<Authentication Between the Controller and Reader/Writer>

Figure 4:
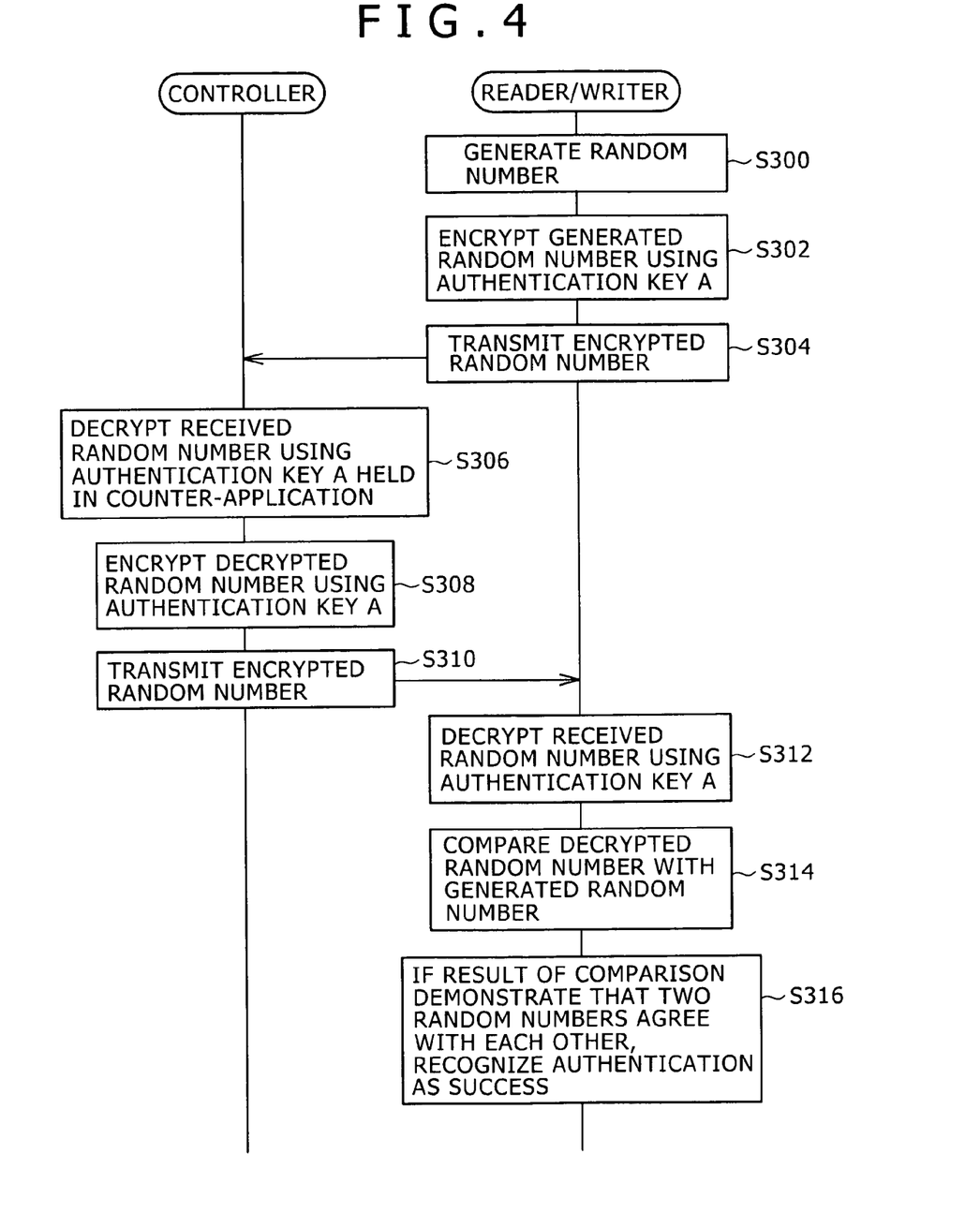
FIG. 4 is a flowchart describing authentication method in accordance with the embodiment.

Next, a detailed flow or process of authentication to be executed between the controller 102 and reader/writer 104 will be described in conjunction with FIG. 4. FIG. 4 describes the process in which the reader/writer 104 authenticates the counter-application A 110 loaded in the controller 102.

First, the reader/writer 104 generates a random number (S300). Thereafter, the reader/writer 104 encrypts the generated random number using the authentication key A 1380 stored in the memory 136 (S302), and transmits the encrypted random number to the controller 102 (S304).

The controller decrypts the received random number using the authentication key A 1100 held in the counter-application A110 (S306). Thereafter, the controller 102 encrypts the decrypted random number using the authentication key A 1100 (S308), and transmits the encrypted random number to the reader/writer 104 (S310).

The reader/writer 104 decrypts the received random number using the authentication key A 1380 stored in the memory 136 (S312). Thereafter, the reader/writer 104 compares the random number decrypted at step S312 with the random number generated at step S300 (S314). If the result of the comparison demonstrates that the two random numbers agree with each other, the reader/writer 104 recognizes the counter-application A110 in the controller 102 as being authentic, and decides that the authentication has succeeded.

A process in which the controller 102 authenticates the reader/writer 104 is realized by replacing the process, which is described in FIG. 4 to be executed by the reader/writer, with the process described to be executed by the controller 102. A description will therefore be omitted. The authentication method implemented in the communication system 100 has been described.

As mentioned above, according to the communication system 100, reader/writer 104, and authentication method in accordance with the present embodiment, the reader/writer 104 prevents any counter-application loaded in the controller 102 from accessing an application other than an application compatible with the counter-application and existent in the IC module 106. Thus, security is guaranteed.

Moreover, in the reader/writer 104, since memory spaces (segments) in which respective pieces of key information are stored are independent of one another, the pieces of key information assigned to a plurality of applications can be safely preserved.

Moreover, the necessity of including a plurality of reader/writers is obviated. Compared with a case where different communication systems are configured in association with applications, costs required for system configuration and maintenance can be reduced.

Moreover, even when a communication system is required to be compatible with a new application, a device in which pieces of key information assigned to the application are stored need not be newly added. The expandability of the system improves.

Referring to the appended drawings, the preferred embodiment of the present invention has been described so far. Needless to say, the present invention is not limited to the embodiment. A person with ordinary skill in the art will apparently be able to think of various variations or modifications within the scope defined by Claims. The variations or modifications shall be acknowledged to belong to the technical field to which the present invention pertains.

For example, in the aforesaid embodiment, the controller 102 and reader/writer 104, and the reader/writer 104 and IC module 106 authenticate mutually. However, the present invention is not limited to this example. For instance, as for the controller 102 and reader/writer 104, the controller 102 may unidirectionally authenticate the reader/writer 104. As for the reader/writer 104 and IC module 106, the IC module 106 may unidirectionally authenticate the reader/writer 104.

It should be understood by those skilled in the art that various modifications, combinations, sub-combinations and alterations may occur depending on design requirements and other factors insofar as they are within the scope of the appended claims or the equivalents thereof.

What is claimed is:

1. A communication system comprising:
    an IC module in which one or more applications are loaded;
    a controller in which counter-applications compatible with the applications are loaded; and
        a reader/writer that reads or writes information from or in the IC module in response to an instruction issued from the controller,
    wherein: the reader/writer includes:
        a memory
            in which one or more pieces of IC access authentication information that are associated with the applications loaded in the IC module and that are used for mutual authentications between the reader/writer and the associated applications respectively are stored and
            in which pieces of group authentication information are stored in association with groups into which the pieces of IC access authentication information are sorted according to the applications; and when the reader/writer is requested to write or read information in or from the IC module by any counter-application in the controller, the reader/writer and the counter-application mutually authenticate using group authentication information;
    if the mutual authentication succeeds,
        the reader/writer and an application in the IC module mutually authenticate using IC access authentication information belonging to a group identified with the group authentication information used for the successful mutual authentication; and
    if the mutual authentication succeeds,
        the reader/writer reads or writes information from or in the IC module in response to an instruction issued from the counter-application.

2. A reader/writer that reads or writes information from or in an IC module, in which one or more applications are loaded, in response to an instruction issued from a controller in which counter-applications compatible with the applications are loaded, comprising:
    a memory in which one or more pieces of IC access authentication information that are associated with the applications loaded in the IC module and that are used to authenticate the associated applications respectively are stored and in which pieces of group authentication information are stored in association with groups into which the pieces of IC access authentication information are sorted according to the applications; and
    a control unit that authenticates a counter-application loaded in the controller using group authentication information, and that if the authentication succeeds, permits the counter-application, of which authentication has succeeded, to use the IC access authentication information belonging to a group identified with the group authentication information used for the successful authentication.

3. The reader/writer according to claim 2, wherein the pieces of IC access authentication information are stored in different segments group by group.

4. The reader/writer according to claim 2, wherein:
    if the authentication of the counter-application in the controller succeeds, the control unit authenticates an application in the IC module using IC access authentication information belonging to the group identified with the group authentication information used for the successful authentication; and
    if the authentication succeeds, the control unit executes reading or writing of information from or in the IC module in response to an instruction issued from the counter-application.

5. The reader/writer according to claim 2, wherein the control unit performs mutual authentication between the reader/writer and the counter-application according to a common key encryption method, and the pieces of group authentication information are common keys.

6. The reader/writer according to claim 4, wherein the control unit performs mutual authentication between the reader/writer and an application in the IC module according to a common key encryption method, and the pieces of IC authentication information are common keys.

7. A computer readable medium storing a program that when executed causes a reader/writer, which reads or writes information from or in an IC module, in which one or more applications are loaded, in response to an instruction issued from a controller in which counter-applications compatible with the applications are loaded, to execute:

a step of receiving a request for writing or reading of information in or from the IC module from a counter-application in the controller;

a step of authenticating the counter-application using group authentication information; and a step of, if the authentication succeeds, permitting the counter-application, of which authentication has succeeded, to use IC access authentication information belonging to a group identified with the group authentication information used for the successful authentication, wherein:

the reader/writer includes a memory in which one or more pieces of IC access authentication information that are associated with the applications loaded in the IC module and that are used to authenticate the associated applications respectively are stored and in which pieces of group authentication information are stored in association with groups into which the pieces of IC access authentication information are sorted according to the applications.

8. An authentication method to be implemented in a reader/writer that reads or writes information from or in an IC module, in which one or more applications are loaded, in response to an instruction issued from a controller in which counter-applications compatible with the applications are loaded, comprising:

a step of receiving a request for writing or reading of information in or from the IC module from a counter-application in the controller;

a step of authenticating the counter-application using group authentication information; and a step of, if the authentication succeeds, permitting the counter-application, of which authentication has succeeded, to use IC access authentication information belonging to a group identified with the group authentication information used for the successful authentication, wherein:

the reader/writer includes a memory in which one or more pieces of IC access authentication information that are associated with the applications loaded in the IC module and that are used to authenticate the associated applications respectively are stored and in which pieces of group authentication information are stored in association with groups into which the pieces of IC access authentication information are sorted according to the applications.

9. The authentication method according to claim 8, wherein the authenticating step includes a step at which:

an application in the IC module is authenticated using IC access authentication information belonging to the group identified with the group authentication information used for the successful authentication; and if the authentication succeeds, information is read or written from or in the IC module in response to an instruction issued from the counter-application.

* * * * *